W. C. WHITE.
GASKET FOR TRAIN PIPE COUPLINGS.
APPLICATION FILED NOV. 25, 1913. RENEWED MAY 20, 1916.
1,209,788.
Patented Dec. 26, 1916.
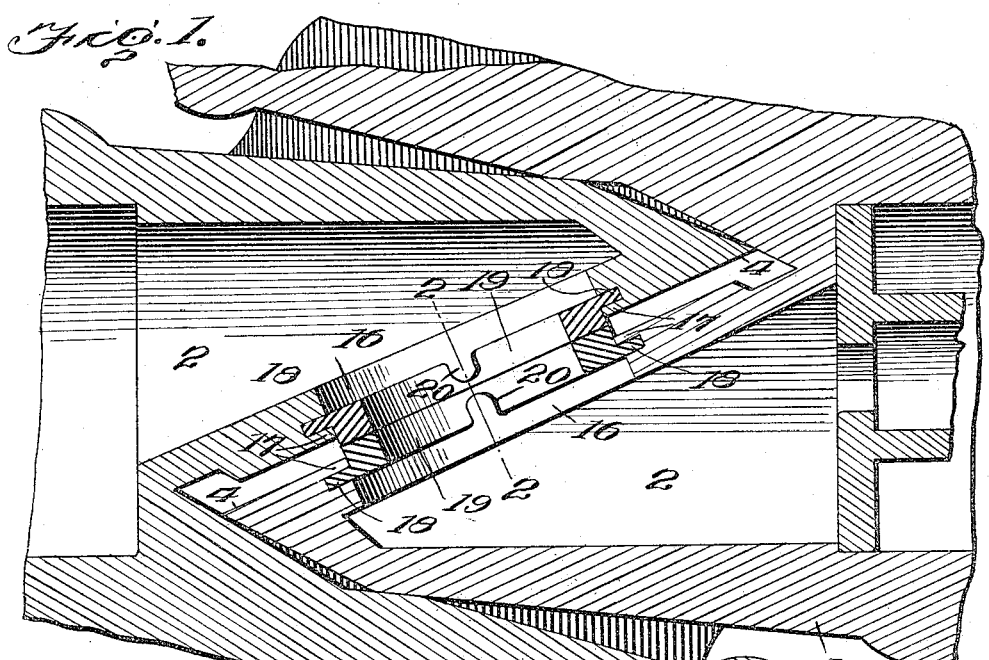
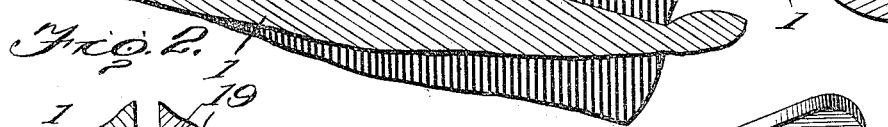
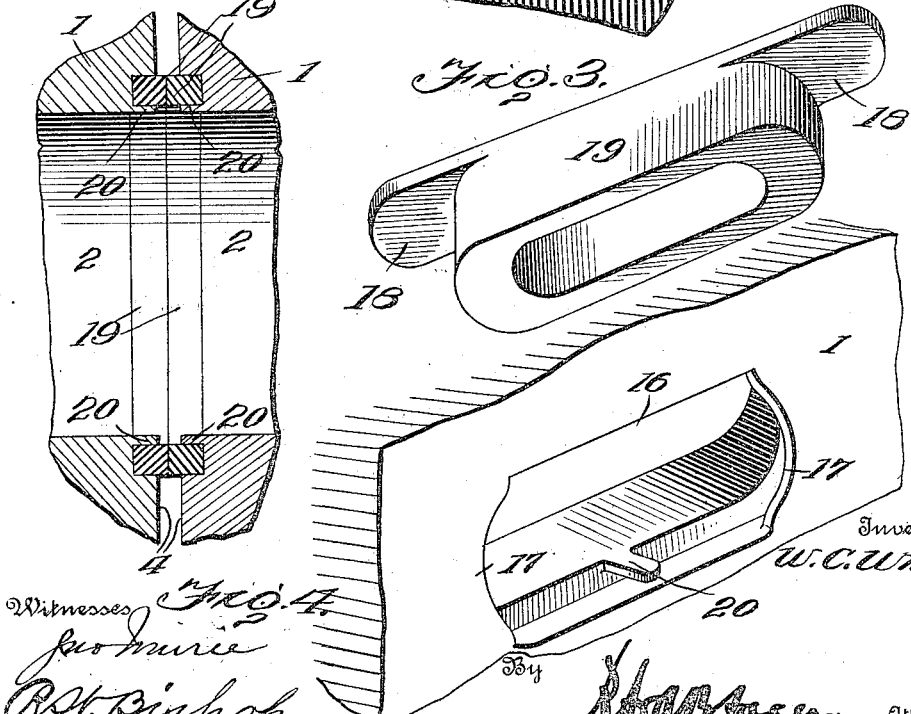

UNITED STATES PATENT OFFICE.

WALTER C. WHITE, OF LOS ANGELES, CALIFORNIA, ASSIGNOR TO INTERNATIONAL COUPLERS COMPANY, OF LOS ANGELES, CALIFORNIA, A CORPORATION OF CALIFORNIA.

GASKET FOR TRAIN-PIPE COUPLINGS.

1,209,788.  Specification of Letters Patent.  Patented Dec. 26, 1916.

Original application filed March 20, 1913, Serial No. 755,697. Divided and this application filed November 25, 1913, Serial No. 802,955. Renewed May 20, 1916. Serial No. 98,952.

*To all whom it may concern:*

Be it known that I, WALTER C. WHITE, a citizen of the United States, residing at Los Angeles, in the county of Los Angeles and State of California, have invented certain new and useful Improvements in Gaskets for Train-Pipe Couplings, of which the following is a specification.

This invention relates to train-pipe couplings, and has special reference to the means for effecting fluid-tight joints around the registering ports of opposed heads, this application being a division of an application filed by me March 20, 1913, Serial No. 755,697.

In the annexed drawings, Figure 1 is a horizontal section through the engaging portions of two coupler-heads; Fig. 2 is a vertical section on the line 2—2 of Fig. 1; Fig. 3 is a detail perspective of a gasket; Fig. 4 is a detail perspective view showing a port in which the gasket is fitted.

The coupler heads 1 are constructed with longitudinal chambers 2 with which the train-pipes communicate in the usual manner. In the present illustration, the front wall 4 of the coupler head is disposed obliquely to the longitudinal axis of the head and the ports 16 are formed in said front wall. The ports are substantially elliptical in outline, as shown most clearly in Fig. 3, and in the walls of the ports are formed recesses or seats to receive the gaskets 19. It will be readily noted from Figs. 1 and 3 that the gaskets extend substantially longitudinally of the coupling and are provided with wide end faces forming elongated bearing surfaces to meet similar surfaces on an opposed coupler and provide a large, fluid-tight joint between the passages of opposed heads. As the coupling heads wear, the gaskets slide upon each other and overlap so as to compensate for wear and, at the same time, leave an open port ample to permit flow of fluid through the coupling. The gaskets are elongated so that in their extreme overlapping relation an open passage will be provided of a diameter not less than the width of the port. The wide end faces of the gasket will preserve a tight joint under this extreme condition. At the ends of the ports are segmental flanges 17 which coact with the walls of the seats to form pockets into which the flanges 18 on the gaskets may be sprung and retaining lugs or lips 20 are formed at the inner sides of said recesses to extend over the inner sides of the gaskets and thereby aid in keeping the gaskets in place.

As the gaskets are disposed at an angle to the longitudinal axis of the coupler heads, unnecessary pressure upon the same is avoided, while, at the same time, they will be held in sufficiently close engagement to form a fluid-tight joint between the opposed couplers.

What I claim is:

A coupler head provided with an elongated port, said port having a seat formed in its wall and having segmental flanges across its ends co-acting with said seat to form pockets, an elongated gasket fitting to said seat and provided at its ends with flanges engaging said pockets, and a retainer extending from the seat between the pockets over the edge of the gasket.

In testimony whereof I affix my signature in presence of two witnesses.

WALTER C. WHITE. [L. S.]

Witnesses:
G. W. BEALS,
BESSIE L. MCGRATTY.

Copies of this patent may be obtained for five cents each, by addressing the "Commissioner of Patents, Washington, D. C."